US009228130B2

(12) United States Patent
Zhong et al.

(10) Patent No.: US 9,228,130 B2
(45) Date of Patent: Jan. 5, 2016

(54) ALIGNMENT FILM, A METHOD OF FABRICATING THE SAME, AND A LIQUID CRYSTAL DISPLAY USING THE SAME

(71) Applicant: Shenzhen China Star Optoelectronics Technology Co., Ltd., Shenzhen, Guangdong (CN)

(72) Inventors: Xinhui Zhong, Shenzhen (CN); Kuan-cheng Lee, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 215 days.

(21) Appl. No.: 14/001,651

(22) PCT Filed: Jun. 28, 2013

(86) PCT No.: PCT/CN2013/078418
§ 371 (c)(1),
(2) Date: Aug. 26, 2013

(87) PCT Pub. No.: WO2014/205801
PCT Pub. Date: Dec. 31, 2014

(65) Prior Publication Data
US 2014/0375940 A1 Dec. 25, 2014

(30) Foreign Application Priority Data
Jun. 25, 2013 (CN) .......................... 2013 1 0256729

(51) Int. Cl.
*C09K 19/56* (2006.01)
*G02F 1/1334* (2006.01)
(Continued)

(52) U.S. Cl.
CPC ............ *C09K 19/56* (2013.01); *C08G 73/1071* (2013.01); *C09D 179/08* (2013.01);
(Continued)

(58) Field of Classification Search
CPC ................. C09K 19/322; C09K 19/56; C09K 2019/122; C09K 2019/123; C09K 2019/0448; C09K 2019/548; G02F 1/1334; G02F 1/133711; Y10T 428/1005; Y10T 428/1018; Y10T 428/1023
See application file for complete search history.

(56) References Cited

U.S. PATENT DOCUMENTS

2009/0208673 A1* 8/2009 Seki et al. ...................... 428/1.1
2009/0292103 A1* 11/2009 Suzuki et al. ................. 528/322
(Continued)

FOREIGN PATENT DOCUMENTS

| CN | 101050367 A | 10/2007 |
|---|---|---|
| CN | 101824327 A | 1/2013 |

(Continued)

OTHER PUBLICATIONS

English translation for JP 2010198999 by machine language provided by Espacenet.*

*Primary Examiner* — Shean C Wu
(74) *Attorney, Agent, or Firm* — Andrew C. Cheng

(57) ABSTRACT

The present invention relates a technique of liquid crystal display, especially to an alignment film applied to a substrate of a liquid crystal display. The alignment film includes a plurality of alignment molecules including polyamic acid and/or polyimide and a plurality of photo-sensitive molecules including terphenyl and/or substituted terphenyl, wherein a mass ratio of the plurality of alignment molecules to the plurality of photo-sensitive molecules is 3~7%:0.0002~2%. The present invention further provides a method of fabricating the alignment film and a liquid crystal display using the same. Due to the photosensitive group of the monomers, the plurality of alignment molecules can be formed with an appropriated rate, and the alignment film formed thereby has homogeneity. Therefore, the optic quality and overall performance of the liquid crystal display are enhanced.

15 Claims, 2 Drawing Sheets

(51) Int. Cl.
*G02F 1/1337* (2006.01)
*C09K 19/32* (2006.01)
*C09D 179/08* (2006.01)
*C08G 73/10* (2006.01)
*C09K 19/04* (2006.01)
*C09K 19/12* (2006.01)

(52) U.S. Cl.
CPC ....... *C09K19/322* (2013.01); *C09K 2019/0448* (2013.01); *C09K 2019/122* (2013.01); *C09K 2019/123* (2013.01); *G02F 1/1334* (2013.01); *G02F 1/133711* (2013.01); *Y10T 428/1018* (2015.01); *Y10T 428/1023* (2015.01)

(56) References Cited

U.S. PATENT DOCUMENTS

2011/0199566 A1\* 8/2011 Mazusaki et al. ............. 349/123
2011/0267574 A1\* 11/2011 Kawahira et al. ............. 349/158
2014/0085591 A1\* 3/2014 Feng et al. .................... 349/183

FOREIGN PATENT DOCUMENTS

CN 102863971 A 1/2013
JP 2010197999 A \* 9/2010

\* cited by examiner

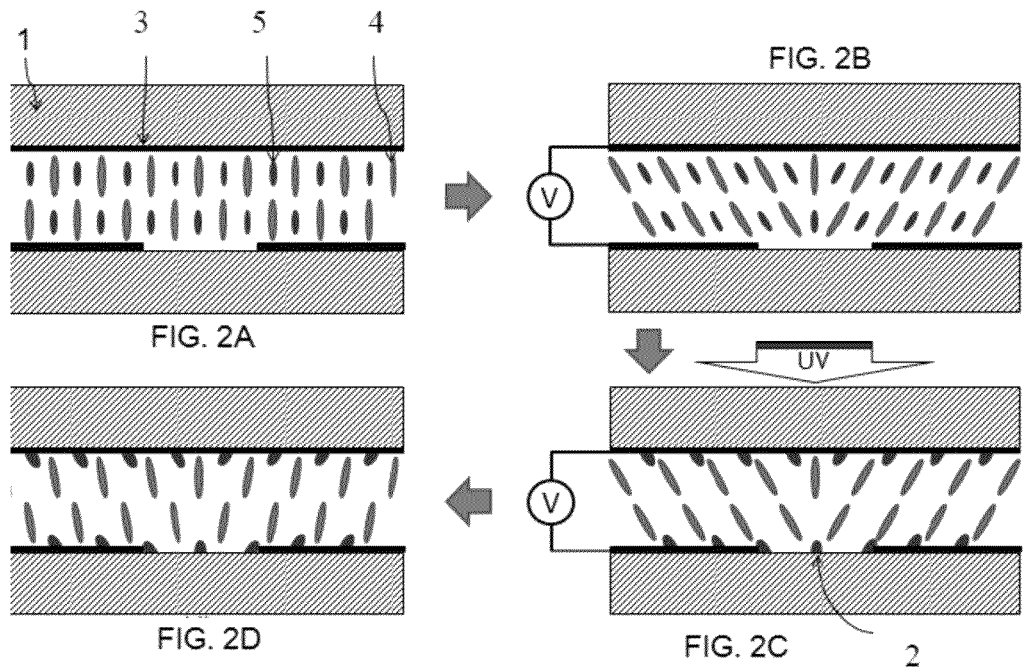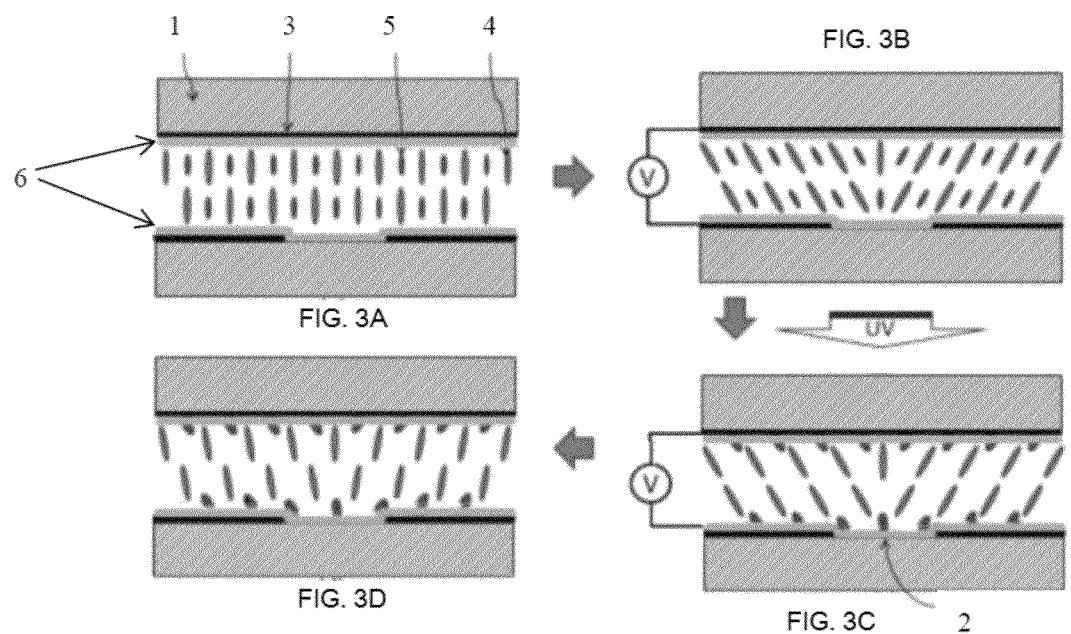

ALIGNMENT FILM, A METHOD OF FABRICATING THE SAME, AND A LIQUID CRYSTAL DISPLAY USING THE SAME

FIELD OF THE INVENTION

The present invention relates to a technique of liquid crystal display, and more particularly to a new technique of an alignment film, liquid crystal display using the same, and a method of fabricating the same.

BACKGROUND OF THE INVENTION

With the progress of communicating technique, electronic products such as cell phones, computers and even house electric equipment are getting to have intelligent, portable and mobile functionalities, so that efficiency of exchanging information between users and such electronic products become a critical point of the progress of communicating technique. For an aspect of clearly and efficiently delivering information to users of such electronic products, a display of such electronic products is designed to meet multiple demands such as high efficiency, upgraded quality, large memory capacity, lower weight, lower cost and lower power consumption. Consequentially, the conventional CRT display was replaced by the liquid crystal display (LCD) in just a few years.

In early stage, the LCD is the twisted nematic (TN) or the super twisted nematic (STN) type, and liquid crystal molecules with a chiral agent disposed in the TN/STN type LCD is a positive (nematic) type. A long axis of the positive type liquid crystal molecules is parallel to a surface of each substrate of the TN/STN type LCD when no electricity is applied thereto. An orientation of the positive type liquid crystal molecules is determined by a rubbing direction (i.e. alignment direction) formed on an alignment layer which is usually made of polyimide and disposed on the surface of each substrate of the TN/STN type LCD. The alignment directions of the alignment layers respectively disposed on the two substrates of the TN/STN type LCD are perpendicular to each other, whereby the positive type liquid crystal molecules exhibit a continuously twisted arrangement from one substrate to the other substrate, wherein a twisted angle of the positive type liquid crystal molecules in the TN type LCD is about 90 degree, and a twisted angle thereof in the STN type LCD is about 270 degree. Besides the two substrates and the positive type liquid crystal molecules disposed therein, the TN/STN type LCD includes two polarizer layers and a backlight, wherein the two polarizer layers are respectively adhered to outer surfaces of the two substrates and perpendicular to a light-absorbing axis of each substrate. Light emitted from the backlight is polarized by one polarizer layer disposed between the substrate and the back light, then a polarized direction of the polarized light is transformed by the positive type liquid crystal molecules arranged at the twisted angle, and then the polarized light passes through the other polarizer layer, so as the TN/STN type LCD is on transmitting state (also called "white state"). When a voltage is applied to the TN/STN type LCD, the long axis of the positive type liquid crystal molecule tends to align according to the direction of electric field, and the polarized light is passed through the untwisted liquid crystal molecules then reflected by the other polarizer layer, so as the TN/STN type LCD is on reflecting state (also called "black state"). Drawbacks of the TN/STN type LCD are small viewable angle, severe brightness difference and color difference at large view angles. Therefore, a compensation film must be applied thereto for correcting such drawbacks and it causes to increase the manufacture cost of the TN/STN type LCD.

A thin-film transistor liquid crystal display (TFT-LCD) of Multi-domain vertical alignment (MVA) type provides an excellent solution to the view angle limitation that the TN/STN type LCD is subjected to, and it uses negative (nematic) type liquid crystal molecules and vertical type alignment films. When no voltage is applied to the MVA type TFT-LCD, the long axis of the negative type liquid crystal molecules is perpendicular to the surface of the substrate. A voltage applied to the MVA type TFT-LCD would cause the negative type liquid crystal molecules to tilt, and the long axis of the negative type liquid crystal molecule is allowed to align in a direction perpendicular to the electric field. To overcome the view angle limitation, a pixel of the MVA type TFT-LCD is divided into multiple domains and the negative type liquid crystal molecules disposed therein are caused to tilt in different directions so that the MVA type TFT-LCD can provide similar viewing effect at various directions.

Several ways can be adopted to allow liquid crystal molecules, disposed in different domains of a pixel, orienting in different direction respectively. As shown in FIG. 1A, the first way is to form bumps 2 on upper and lower substrate 1 having ITO electrodes 3 formed thereon by means of exposing development, so that the bumps 2 can cause a pre-tilt angle for liquid crystal molecules around the bumps, and thus guide the other liquid crystal molecules to tilt to predetermined directions.

As shown in FIG. 1B, the second way is to form ITO pixel electrodes 3 that are of predetermined patterns on upper and lower substrates respectively, so that an electric field induces a predetermined tilt angle, thereby controlling the orientation of the liquid crystal molecules in different domains. The second way is often called patterned vertical alignment (PVA).

As shown in FIG. 2A to 2D, the third way, so-called polymer stabilized vertical alignment (PSVA), is to form a patterned ITO electrode 3, usually formed as a fishbone type, on one substrate 1, and to form a full-layer ITO electrode 3 over the other substrate 1, and a plurality of photo-polymerizable monomers 5 are added in the liquid crystal medium. An electric field is firstly applied to cause tilting liquid crystal molecules in the liquid crystal medium, and then radiation of ultraviolet ray is applied to cause a polymerization of the plurality of the photo-polymerizable monomers to form bumps 2 deposited on the surface of the substrate 1, and the bumps 2 can guide a tilting angle of the liquid crystal molecules. In comparison to the other MVA techniques, the PSVA technique has a lot of advantages such as higher transmission, higher contrast and faster response, so that the PSVA technique becomes a mainstream technique of fabricating large-size TFT-LCDs. However, a key point in the PSVA technique is to control a polymerization reaction of the plurality of photo-polymerizable monomers 5, wherein to control the polymerization reaction includes a photo-reaction rate, homogeneity of the bumps 2, and unreacted residue of the plurality of photo-polymerizable monomers 5.

Therefore, there is a need of providing an improved PSVA technique of fabricating a LCD having enhanced performance.

SUMMARY OF THE INVENTION

In accordance with an aspect for increasing optimal control of a polymerization reaction of a plurality of photo-polymerizable monomers, the present invention provides an alignment film applied to a substrate of a LCD, and the alignment film can enhance utilization of light energy, so as to effectively induce and control the polymerization reaction thereof. The alignment film, disposed on a substrate of a liquid crystal display, includes a plurality of alignment molecules and a plurality of photo-sensitive molecules. The plurality of alignment molecules includes polyamic acid and/or polyimide. The plurality of photo-sensitive molecules includes terphenyl and/or substituted terphenyl, wherein a mass ratio of the plurality of alignment molecules to the plurality of photo-sensitive molecules is 3~7%:0.0002~2%.

In a preferred embodiment, the substituted terphenyl includes an alkyl, alkoxy or ester group of carbon atoms less than or equal to twelve; or one or more than one heteroatom selected from N, O, F, Si, P, S, Cl, Br or I.

In a preferred embodiment, a molecular weight of each alignment molecule is in $5 \times 10^3 \sim 5 \times 10^5$ g/mole.

In accordance with another aspect, the present invention provides a method of fabricating an alignment film including steps as follows. Firstly, the plurality of alignment molecules and the plurality of photo-sensitive molecules according to the present invention are provided. Then, the plurality of alignment molecules and the plurality of photo-sensitive molecules are dissolved with a solvent to form an alignment molecule solution, wherein a mass ratio of the plurality of alignment molecules, the plurality of photo-sensitive molecules and the solvent is 3~7%:0.0002~0.2%:92.8~96.9998%. Then, the alignment molecule solution is coated on a substrate. Then, the alignment molecule solution coated on the substrate is prebaked under a temperature in 100~200° C. for 20 to 60 minutes, and then baked under a temperature in 180~250° C. for 30 to 150 minutes to form an alignment film.

In a preferred embodiment, the solvent includes one or more than one composition of N-methylpyrrolidone (NMP), N-ethyl pyrrolidone (NEP), γ-butyrolactone (γ-BL), N,N-dimethylformamide (DMF), N,N-dimethylacetamide (NMAc), dimethyl sulfoxide (DMSO), m-cresol or chloroform.

In a preferred embodiment, the alignment molecule solution further includes a leveling agent, a mass ratio of the leveling agent to the alignment molecule solution is in 0.01~2%, and the leveling agent is selected from isophorone, diacetone alcohol, aromatic hydrocarbon mixture or dibasic ester mixture.

In accordance with another aspect, the present invention provides a liquid crystal display. The liquid crystal display includes two substrates, a liquid crystal medium and two alignment films. The two substrates are oppositely arranged and parallel to each other. The liquid crystal medium has a plurality of photo-polymerizable monomers, and is disposed between the two substrates. Each alignment film is formed on a surface of each substrate neighboring the liquid crystal medium, wherein each alignment film includes the plurality of alignment molecules and the plurality of photo-sensitive molecules according to the present invention.

In a preferred embodiment, the plurality of photo-polymerizable monomers has one or more than one compound represented by following:

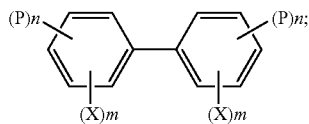

formula 1

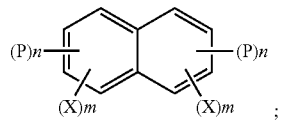

formula 2

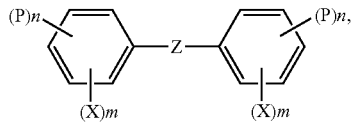

formula 3 wherein the functional group P represents a polymerizable group including one or more than one group selected from methacrylate, acrylate, vinyl, ethylene or epoxy; the integer n of 1, 2 or 3 represents a number of the functional group(s) P bonding to an aromatic ring; the substituent X includes —F, —Cl, —Br, —CH3, —CN or an alkyl, alkyl ether or alkyl thiol ether group consisted of 2~8 carbon atoms; the integer m of 1, 2 or 3 represents a number of the substituent(s) X bonding to the aromatic ring; and the functional group Z represents one or more than one group selected from —O—, —COO—, —OCO—, —CH2O—, —OCH2—, —O(CH2)2O—, —COCH2-, —CH2- or —C≡C—.

In a preferred embodiment, a hydrogen atom (H) in the functional group Z is substituted by —F, —Cl, —Br, —CH3 or —CN.

In a preferred embodiment, the liquid crystal display further includes two electrodes respectively disposed between each alignment film and each substrate.

In a preferred embodiment, a mass ratio of the plurality of photo-polymerizable monomers to the liquid crystal medium is in 0.25~5%.

In accordance with the present invention, the alignment film includes the plurality of photo-sensitive molecules such as terphenyl or substituted terphenyl that can enhance absorption of light energy, and effectively induce and control the polymerization reaction of the plurality photo-polymerizable monomers. Therefore, a mura drawback in a liquid crystal display using the alignment film can be obviated, and a optic performance of the liquid crystal display can be highly enhanced.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 2A~2D are schematic cross-sectional views illustrating a partial process flow of a method of PSVA technique according to prior art; and FIG. 3A~3D are schematic cross-sectional views illustrating a partial process flow of a method of PSVA technique according to the present invention.

DETAILED DESCRIPTION OF PREFERRED EMBODIMENTS

Figure 1A:
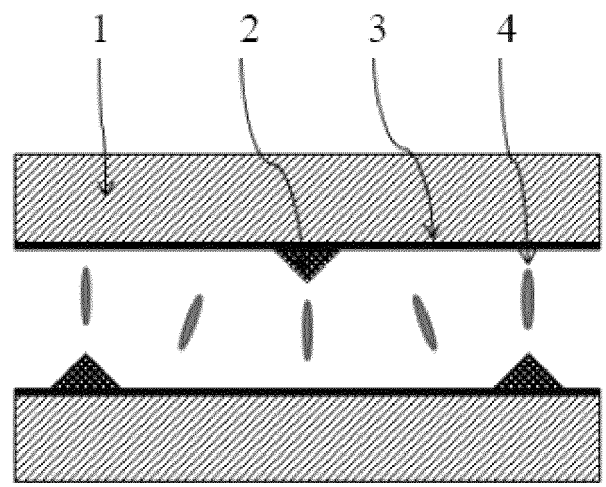
FIG. 1A~1B are schematic cross-sectional views illustrating a partial process flow of a method of exposure development and PVA technique according to prior art.
Figure 1B:
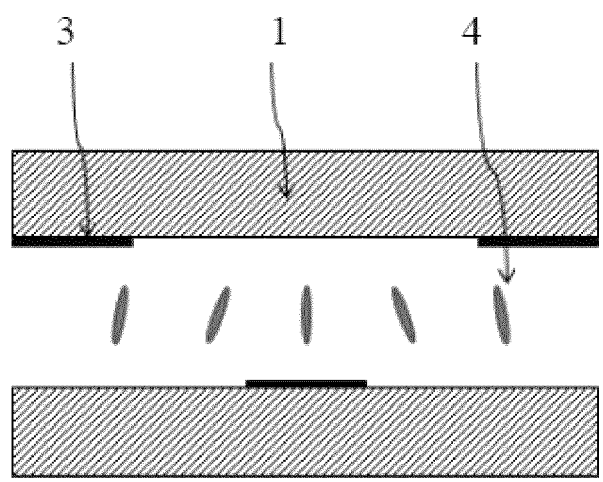

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

According to the present invention, an alignment film and a liquid crystal display using the same include a mixture of a plurality of alignment molecules and a plurality of photo-sensitive molecules, wherein the plurality of photo-sensitive molecules can enhance utilization of light energy from a certain wavelength ultraviolet, and control a polymerization rate of a plurality of photo-polymerizable monomers, so that homogeneity of bumps formed by polymerizing the plurality of photo-polymerizable monomers can be obtained.

Embodiment 1

The plurality of alignment molecules is polyimide (PI) formed by polymerizing monomers of at least compound having formula e as

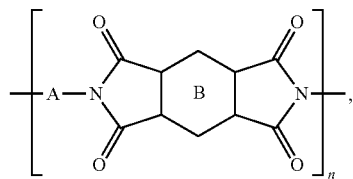

wherein the structure A is diamine and the structure B is dianhydride. In this embodiment, the polyimide PI is formed by polymerizing monomers of the compound having formula a, formula b or formula c, and a reaction of forming the plurality of alignment molecules (i.e. the polyimide PI) is represented as following reaction formula:

wherein a ratio of the coefficient m to the coefficient n is 1:0.25~4. Then, terphenyl having formula d as

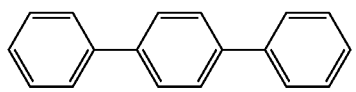

and the PI having formula e are used to form an alignment film.

Then, the present invention provides a method of fabricating the alignment film including steps as follows:

I. dissolving the plurality of alignment molecules (i.e. the polyimide PI) and the terphenyl with a solvent to form an alignment molecule solution, wherein the solvent is N-methylpyrrolidone (NMP), and a mass ratio of the polyimide PI, the terphenyl and the solvent is 3%:0.01%:94%;

II. coating the alignment molecule solution on a substrate; and

III. prebaking the alignment molecule solution coated on the substrate under 100° C. for 20 minutes, and then baking the alignment molecule solution coated on the substrate under 180° C. for 30 minutes to evaporate the solvent, so as to allow the polyimide PI dehydrated and the terphenyl dispersed in the polyimide PI. Then, the alignment film is formed on the substrate.

Then, the present invention provides a liquid crystal display using the alignment film. As shown in FIG. 3A, the liquid crystal display includes two substrates 1, a liquid crystal medium and two alignment films. The two substrates 1 are oppositely arranged and parallel to each other. The liquid crystal medium has a plurality of liquid crystal molecules 4

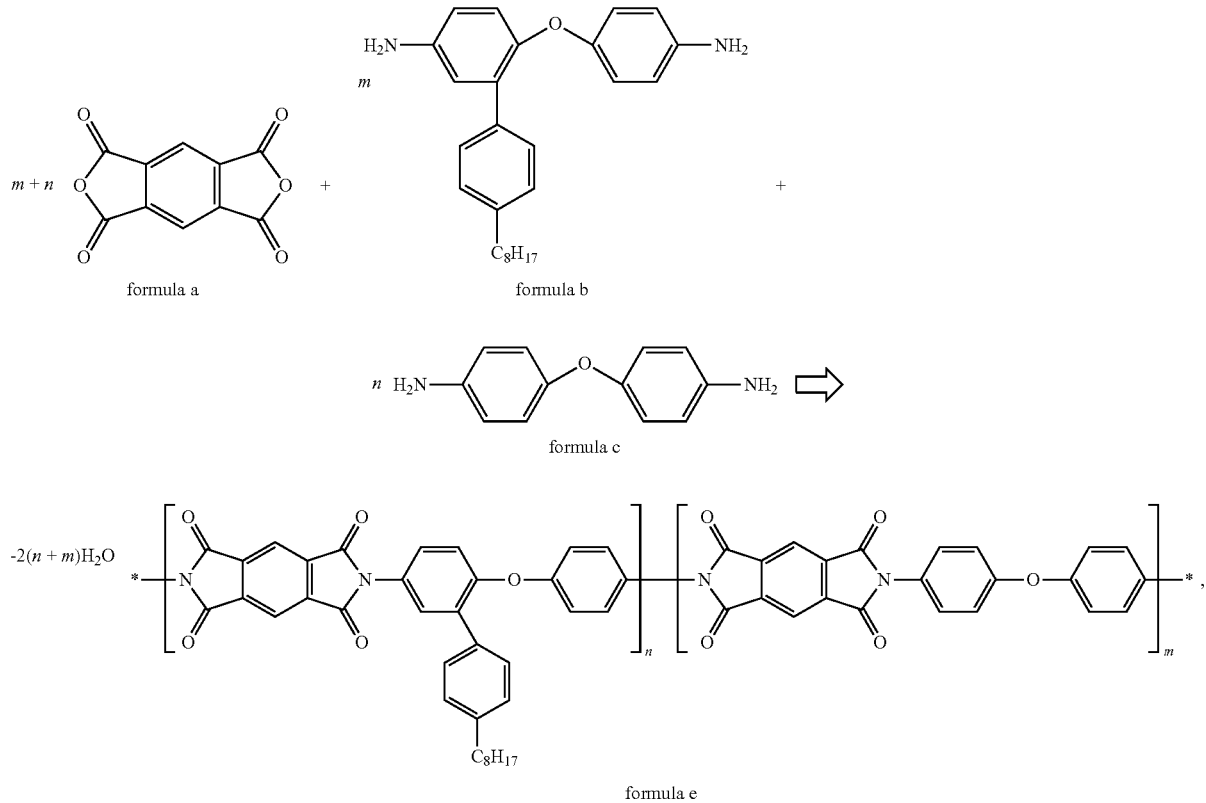

and a plurality of photo-polymerizable monomers 5, and it is disposed between the two substrates 1. An electrode 3 of plane type is disposed above a surface of one substrate neighboring the liquid crystal medium, and an electrode 3 of fishbone type is disposed above the other substrate 1. The plurality of liquid crystal molecules 4 is lined up in a direction when the two electrodes 3 are coupled to a power supply. Two alignment films 6 are respectively formed on the two electrodes 3. The two alignment films 6 provide an appropriate preset angle, so that a response time of the plurality of liquid crystal molecules can be shrunken. The plurality of photo-polymerizable monomers 5 has formula 1 as

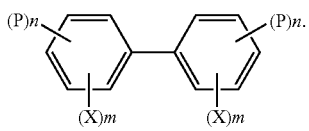

In this embodiment, a sub-formula of the plurality of photo-polymerizable monomers 5 is represented by formula f as

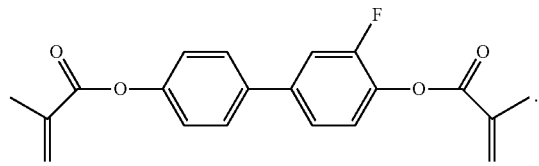 [SMILES: C=C(C)C(=O)Oc1ccc(-c2ccc(OC(=O)C(=C)C)c(F)c2)cc1]

An aligning mechanism between the plurality of alignment molecules including the plurality of photo-sensitive molecules and the plurality of photo-polymerizable monomers in the liquid crystal medium includes steps as follows. Firstly, please refer to FIG. 3A again, the two alignment films 6 according to the present invention are applied to a liquid crystal display fabricated by the polymer stabilized vertical alignment (PSVA) technique, the plurality of photo-polymerizable monomers 5 having formula f is added in the liquid crystal medium, and a mass ratio of the plurality of photo-polymerizable monomers to the liquid crystal medium is 0.3%. Then, as shown in FIG. 3B, the plurality of liquid crystal molecules 4 disposed in several domains is tilted at a preset angle through the electric field. Then, as shown in FIG. 3C-3D, the plurality of photo-sensitive molecules having formula f in the two alignment films 6 can strongly absorb light energy from ultraviolet in wavelength 260 nm to 380 nm, and deliver the light energy to cause a polymerization of the plurality of photo-polymerizable monomers 5. Therefore, a plurality of polymers 2 which is formed by the plurality of photo-polymerizable monomers 5 dispersing in the liquid crystal medium is rearranged in the liquid crystal medium. The plurality of polymers 2 (i.e. "bumps" 2) is used for causing an orientation of the plurality of liquid crystal molecules 4. On the other hand, the plurality of photo-sensitive molecules (i.e. the terphenyl) in the plurality of alignment molecules are evenly distributed in the alignment film 6, so as to allow the bumps 2 formed with homogeneity, and unreacted residue of the plurality of photo-polymerizable monomers 5. Therefore, the alignment film according to the present invention can meet demands of fabricating the liquid crystal display. Moreover, due to the alignment films 6 having the plurality of photo-sensitive molecules (i.e. the terphenyl) evenly distributed therein, the bumps 2 can be uniformly formed above the alignment films 6, and then they provide an appropriate preset angle for the plurality of liquid crystal molecules 4 tilting in the liquid crystal medium. It is noted that a photo-polymerization time of conventional photo-polymerizable monomers needs more than two hours to meet a standard of residue-monomers amount being lower than 20 ppm. In comparison the present invention to conventional photo-polymerizable monomers, the alignment films 6 can effectively shorten a polymerization time of the plurality of photo-polymerizable monomers 5, so that the polymerization time thereof needs only 80 minutes to meet the same standard (i.e. residue-monomers amount being lower than 20 ppm) under the same the polymerization conditions of polymerizing conventional photo-polymerizable monomers. Generally, the faster polymerization of the plurality of photo-polymerizable monomers is performed, the better optic quality of the liquid crystal display is obtained.

Embodiment 2

In this embodiment, a plurality of photo-sensitive molecules and a plurality of photo-polymerizable molecules are different from Embodiment 1. The plurality of photo-sensitive molecules has formula g as

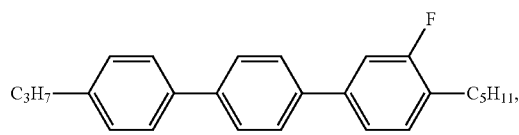

and the plurality of photo-polymerizable molecules has formula h as

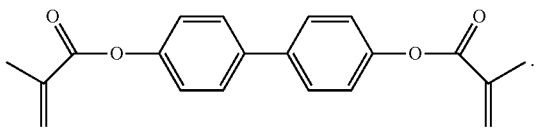 [SMILES: C=C(C)C(=O)Oc1ccc(-c2ccc(OC(=O)C(=C)C)cc2)cc1]

In this embodiment, the plurality of photo-sensitive molecules having formula g and the plurality of alignment molecules (i.e. the polyimide PI) having formula a are dissolved with a solvent of γ-butyrolactone (γ-BL), and a leveling agent of isophorone is mixed into the solvent to form an alignment molecule solution, wherein a mass ratio of the polyimide PI, the plurality of photo-sensitive molecules, γ-BL and isophorone is 7%:0.02%:92.98%:0.01%. Then, the alignment molecule solution is coated on a substrate. Then, the alignment molecule solution coated on the substrate is prebaked under 200° C. for 60 minutes, and then baked under 250° C. for 150 minutes to form the alignment film. In this embodiment, a mass ratio of the plurality of photo-polymerizable monomers having formula h to the liquid crystal medium is 0.5%. A photo-polymerization time of the plurality of photo-polymerizable monomers having formula h needs only 90 minutes to meet the same standard (i.e. residue-monomers amount being lower than 20 ppm) under the same polymerization conditions of conventional photo-polymerizable monomers, and the mura drawback in the liquid crystal display can be obviated. The alignment mechanism in this embodiment is as the description in embodiment 1, and it is not redundantly described herein.

In the present invention, the polyimide PI for fabricating the alignment film is formed by polymerizing monomers of diamine and dianhydeide through dehydration and formation of polyamic acid. As shown in formula e, the structure A of diamie and the structure B of dianhydride can have various types in order to form polyamic acid of various types. For example, in some embodiments, a benzene ring in the formula e has a substituent selected from one or more straight-chain or branched-chain alkyl, alkoxy of carbon atoms less than or equal to twelve; or one or more than one heteroatom selected from N, O, F, Si, P, S, Cl, Br or I.

In benzene ring structure of the plurality of photo-polymerizable monomers based on formula 1, 2 or 3 can be substituted. In the following formulas:

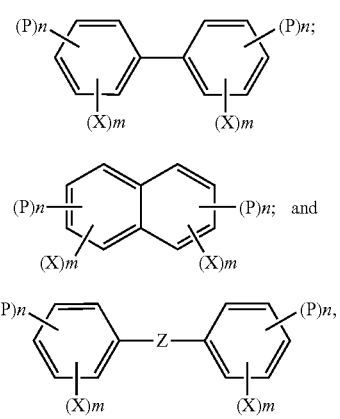

the functional group P represents a polymerizable group comprising one or more than one group selected from methacrylate, acrylate, vinyl, ethylene or epoxy; the integer n of 1, 2 or 3 represents a number of the functional group(s) P bonding to an aromatic ring;
the substituent X comprises —F, —Cl, —Br, —CH3, —CN or an alkyl, alkyl ether or alkyl thiol ether group consisted of 2~8 carbon atoms; the integer m of 1, 2 or 3 represents a number of the substituent(s) X bonding to the aromatic ring; and
the functional group Z represents one or more than one group selected from —O—, —COO—, —OCO—, —CH2O—, —OCH2O—, —O(CH2)2O—, —COCH2-, —CH2- or —C≡C—. In general, a mass ratio of the plurality of photo-polymerizable monomers to the liquid crystal medium is in 0.25~5%, moreover, a preferred mass ratio thereof is in 0.3~5%.

According to the present invention, the solvent for use to dissolve the plurality of alignment molecules can be selected from but not limited to one or more than one composition of N-methylpyrrolidone, N-ethyl pyrrolidone, γ-butyrolactone, N,N-dimethylformamide, N,N-dimethylacetamide, dimethyl sulfoxide, m-cresol or chloroform.

According to the present invention, the leveling agent for use to be added in the alignment molecule solution can be selected from a product well known in the art such as Solvesso 150 (aromatic hydrocarbon mixture), DBE (dibasic ester mixture).

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An alignment film, comprising:
    a plurality of alignment molecules, comprising polyamic acid and/or polyimide; and
    a plurality of photo-sensitive molecules, comprising terphenyl and/or substituted terphenyl, wherein a mass ratio of the plurality of alignment molecules to the plurality of photo-sensitive molecules is 3~7%:0.0002~2%.

2. The alignment film according to claim 1, wherein the substituted terphenyl has a substituent selected from an alkyl, alkoxy or ester group of carbon atoms less than or equal to twelve; or one or more than one heteroatom selected from N, O, F, Si, P, S, Cl, Br or I.

3. The alignment film according to claim 1, wherein a molecular weight of each alignment molecule is in $5\times10^3 \sim 5\times10^5$ g/mole.

4. A method of fabricating an alignment film, comprising steps as follows:
    providing the plurality of alignment molecules and the plurality of photo-sensitive molecules according to claim 1;
    dissolving the plurality of alignment molecules and the plurality of photo-sensitive molecules with a solvent to form an alignment molecule solution, wherein a mass ratio of the alignment molecule solution, the plurality of photo-sensitive molecules and the solvent is 3~7%:0.0002~2%:92.8~96.9998%;
    coating the alignment molecule solution on a substrate; and
    prebaking the alignment molecule solution coated on the substrate under a temperature in 100~200° C. for 20 to 60 minutes, and then baking the alignment molecule solution coated on the substrate under a temperature in 180~250° C. for 30 to 150 minutes to form an alignment film.

5. The method of fabricating the alignment film according to claim 4, wherein the substituted terphenyl comprises has a substituent selected from an alkyl, alkoxy or ester group of carbon atoms less than or equal to twelve; or one or more than one heteroatom selected from N, O, F, Si, P, S, Cl, Br or I.

6. The method of fabricating the alignment film according to claim 4, wherein a molecular weight of each alignment molecule is in $5\times10^3 \sim 5\times10^5$ g/mole.

7. The method of fabricating the alignment film according to claim 4, wherein the solvent comprises one or more than one composition of N-methylpyrrolidone, N-ethyl pyrrolidone, γ-butyrolactone, N,N-dimethylformamide, N,N-dimethylacetamide, dimethyl sulfoxide, m-cresol or chloroform.

8. The method of fabricating the alignment film according to claim 4, wherein the alignment molecule solution further comprises a leveling agent, a mass ratio of the leveling agent to the alignment molecule solution is in 0.01~2%, and the leveling agent is selected from isophorone, diacetone alcohol, aromatic hydrocarbon mixture or dibasic ester mixture.

9. A liquid crystal display, comprising:
    two substrates, oppositely arranged and parallel to each other;
    a liquid crystal medium, having a plurality of photo-polymerizable monomers and disposed between the two substrates; and
    two alignment films, respectively formed on a surface of each substrate neighboring the liquid crystal medium, wherein each alignment film comprises the plurality of alignment molecules and the plurality of photo-sensitive molecules according to claim 1.

10. The liquid crystal display according to claim 9, wherein the substituted terphenyl has a substituent selected from an alkyl, alkoxy or ester group of carbon atoms less than or equal to twelve; or one or more than one heteroatom selected from N, O, F, Si, P, S, Cl, Br or I.

11. The liquid crystal display according to claim 9, wherein a molecular weight of each alignment molecule is in $5\times10^3 \sim 5\times10^5$ g/mole.

12. The liquid crystal display according to claim 9, wherein the plurality of photo-polymerizable monomers has one or more than one compound represented by following:

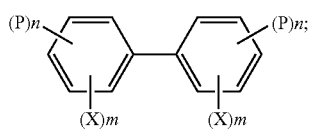

formula 1

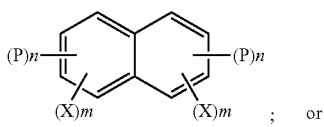

formula 2

; or

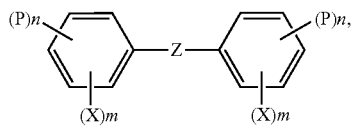

formula 3 wherein the functional group P represents a polymerizable group comprising one or more than one group selected from methacrylate, acrylate, vinyl, ethylene or epoxy; the integer n of 1, 2 or 3 represents a number of the functional group(s) P bonding to an aromatic ring; the substituent X comprises —F, —Cl, —Br, —CH$_3$, —CN or an alkyl, alkyl ether or alkyl thiol ether group consisted of 2~8 carbon atoms; the integer m of 1, 2 or 3 represents a number of the substituent(s) X bonding to the aromatic ring; and the functional group Z represents one or more than one group selected from —O—, —COO—, —OCO—, —CH$_2$O—, —OCH$_2$O—, —O(CH$_2$)$_2$O—, —COCH$_2$—, —CH$_2$— or —C≡C—.

13. The liquid crystal display according to claim 12, wherein a hydrogen atom (H) in the functional group Z is substituted by —F, —Cl, —Br, —CH$_3$ or —CN.

14. The liquid crystal display according to claim 11, further comprising two electrodes respectively disposed between each alignment film and each substrate.

15. The liquid crystal display according to claim 11, wherein a mass ratio of the plurality of photo-polymerizable monomers to the liquid crystal medium is in 0.25~5%.

* * * * *